Jan. 3, 1961 E. E. RIEDEL 2,966,758
FISHING BAIT CONTAINER
Filed Sept. 19, 1958
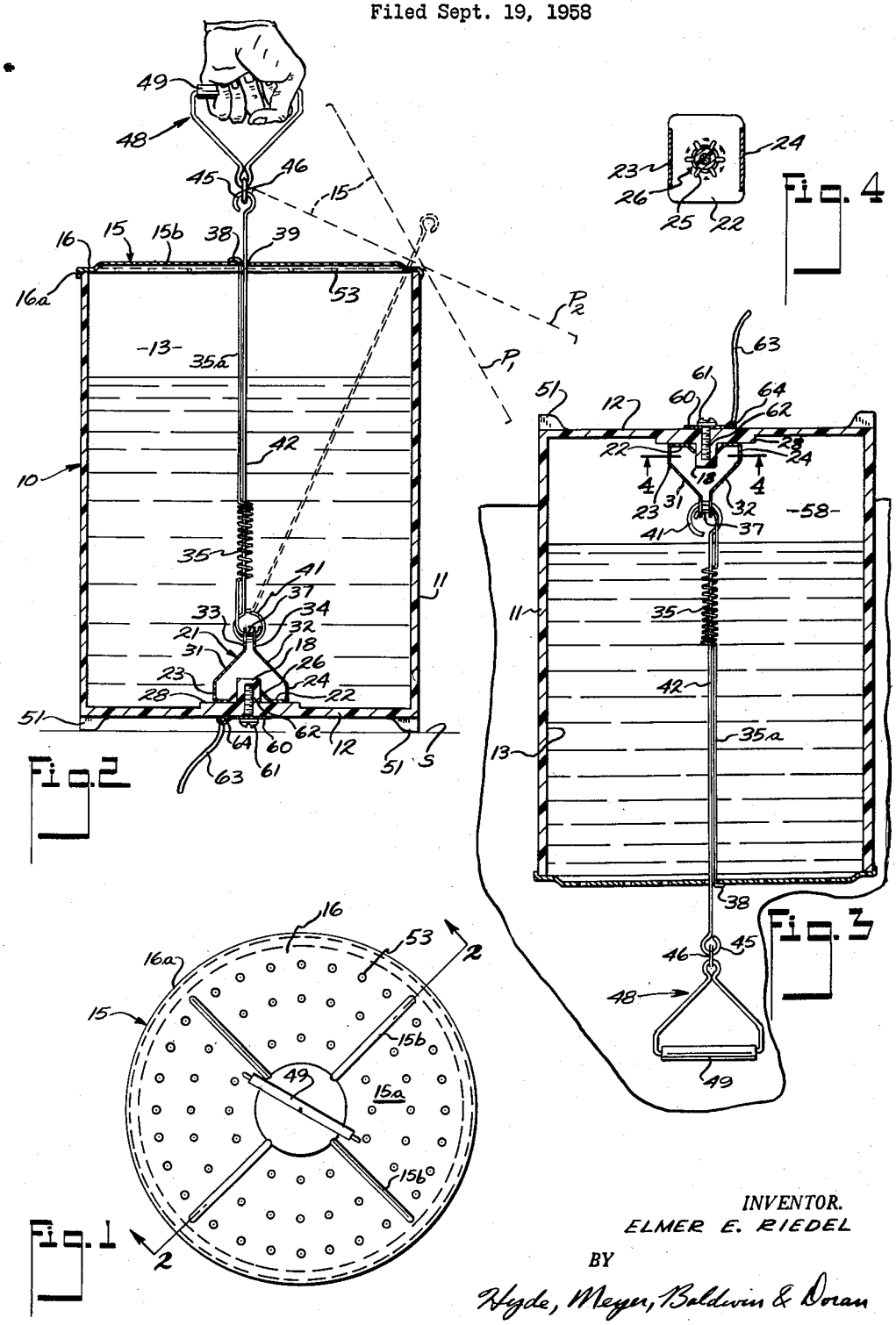
INVENTOR.
ELMER E. RIEDEL
BY
Hyde, Meyer, Baldwin & Doran
ATTORNEYS 2,966,758
Patented Jan. 3, 1961

2,966,758
FISHING BAIT CONTAINER
Elmer E. Riedel, 14537 Grapeland Ave., Cleveland 11, Ohio Filed Sept. 19, 1958, Ser. No. 762,009

6 Claims. (Cl. 43—56)

This invention relates to a container and more particularly to a container especially designed to hold small marine life such as minnows or the like which may be useable as fishing bait.

It is an object of this invention to provide a novel and improved live bait container especially designed to be a portable device and which includes substantially transparent walls which, as the said container is lowered into the water, enables the bait carried therein to be readily seen and hence facilitate the attraction of fish to the same.

Another object of this invention is the provision of a novel and improved live bait container which may be inverted in water and includes means in said inverted position to provide for a change of fresh water to be supplied to the interior bait chamber of the same.

Still another object of this invention is the provision of a novel and improved live bait container as referred to and which is adapted to be floatable in its inverted position.

Another object of this invention is the provision of a novel and improved live bait container as referred to and which is provided with handle means to facilitate its manual transportation, and wherein said handle means are weighted to enable said container, while in said inverted position, to be buoyant at a predetermined level in the water.

Yet another object of this invention is the provision of a live bait container which has a captive lid, said lid being slidable upon the peripheral edges of the container wall and held centrally by a post extending therethrough, said post being pivotally attached to said container at the end opposite the lid and said lid being held down upon the peripheral edges of said wall by means of a spring attached at one end to the lid and extending along the post to terminate in a hook, said hook being affixed to the pivotal means.

Another object of this invention is to provide a live bait container as above referred to and which has a snap-on pivotal support for the lid which is designed to greatly simplify the assembly of said container.

Another object of this invention is to provide a novel and improved live bait container which has a carrying cord affixed to the end of the container opposite the captive lid to thereby facilitate carrying or anchoring said container to one's person, fishing boat, dock or similar convenience.

Another object of this invention is to provide a live bait container having a plurality of leg projections preferably integral with its transparent base wall which thereby provides a level support for the same when set upon a supporting surface.

Additional objects and advantages will be realized by one skilled in the art to which it pertains upon reference to the following description of a preferred embodiment and as illustrated in the accompanying drawings, of which;

Fig. 1 is a top plan view of a live bait container which embodies the concepts of the present invention.

Fig. 2 is a vertical sectional view taken on approximately line 2—2 of Fig. 1, and shows one portable application of the container, and in dotted lines, the manner in which the lid may be moved to obtain accessibility to the interior of the same.

Fig. 3 is a vertical sectional view similar to Fig. 2, however, showing the live bait container in an inverted position and in the manner it is normally floatably disposed within the water; and Fig. 4 is a transverse sectional view taken approximately on line 4—4 of Fig. 3, and shows the configuration of the handle anchoring means and the manner in which it is attached to the container base wall.

Referring now to the drawings, the live bait container or bucket of the present invention, hereinafter referred to as a container is identified in its present form by the reference numeral 10, and comprises a body preferably constructed of a transparent plastic material and having a cylindrical side wall 11 and a circular base wall 12 integrally formed with said side wall on its one end to define a body chamber or cavity 13. Said base wall, if desired, may also be separately fabricated and thereafter attached to one end of the side wall 11 in a liquid leak-proof seal to thus form and define the aforesaid chamber 13.

Means are provided for closing the end of the container body opposite to the base wall 12 to thus prevent the marine life from escaping the chamber 13, and for this purpose a cover 15 is adapted to be placed over said opposite end and is preferably movably secured thereto in a manner as will now be described.

As best seen in Figs. 2 and 3, the present form of cover 15 has a central circular raised part 15a bounded on its periphery by an annular flat rim portion 16, said rim portion, in turn, having a flange 16a formed on its outermost edge and depending substantially perpendicularly from the same. A series of raised ribs 15b may be formed in the rim portion 16 of said cover, the instant embodiment herein shown having said ribs disposed approximately 90° one from the other and extending radially along said rim portion. The cover 15, as just described, is preferably of such dimensions that when placed over the aforesaid opposite end of the body side wall 11, as seen in Fig. 2, the flange 16a of said cover lies externally of and in close proximity to the outer surface of said wall, and the lower face of the flat rim portion 16 abuts the end face of said wall.

With the body structure thus described and held in position such as is shown in Fig. 2, the chamber 13 defined therein is adapted to hold a suitable quantity of water into which may be disposed any desired number of minnows or the like which may thereby be kept alive and hence available for subsequent use as fishing bait as will be understood.

Novel means are provided for attaching the cover 15 to the container body such that the live bait is captured within the same, and also to enable said cover to be readily moved to one of a plurality of positions, such as is indicated by the dotted line positions for said cover at $P_1$ and $P_2$ as seen in Fig. 2, whereby access to the chamber 13 and the aforesaid bait may be obtained.

For this purpose, the inner surface of the container base wall 12 is preferably integrally formed with a stepped boss which has an upper substantially cylindrical central portion 18 extending perpendicularly from said latter wall and centrally into the container chamber 13.

An anchor or retaining clip 21 is fixedly attached to the aforesaid central portion 18 of the boss, and in its present form has a substantially rectangular base 22 integrally provided with arms 23 and 24, extending perpendicularly outwardly from opposed ends of said base.

An aperture is punched or otherwise suitably formed in the aforementioned base 22, and as seen in Fig. 4, a plurality of circumferentially spaced radially extending slots 25 is also formed in the base surrounding said aperture with one end of each of said slots communicating with the latter. In this manner a plurality of equally spaced radially extending leaf members 26 are formed in said base, the free ends of which project toward the center of the base aperture.

As best seen in Figs. 2 and 4, to attach the retaining clip 21 to the aforesaid central boss portion 18, said portion is projected through the base aperture of said clip, the latter being positioned such that the arms 23 and 24 project into the chamber 13. The clip is then pressed toward the body wall 12 of the container 10. The base aperture is of a predetermined diameter so as to locate the aforesaid leaf members 26 in a pre-arranged radially spaced relation such that as the retaining clip is pressed onto the central boss portion 18, said leaf members are flexed outwardly and in the opposite direction to that of the clip movement so as to bind against the outer surface of said central portion to thereby rigidly secure the retaining clip to the latter. In the embodiment shown herein, the leaf members 26 are flexed approximately 45° from the plane of the clip base 22, when the latter is firmly seated on the enlarged lower rim part 28 of the aforesaid stepped boss; however, this angular relation may be of any selected magnitude which will effect to rigidly bind the retaining clip to said boss.

The arms 23 and 24 of the retaining clip 21, as is best seen in Figs. 2 and 3, extend substantially perpendicularly outwardly of the base 22 for a predetermined distance, and thence project toward each other as indicated by the angular arm parts 21 and 32, respectively. The free end of each of said arms 23 and 24 is integrally formed with an eyelet denoted by the reference characters 33 and 34, respectively. Said eyelets are preferably disposed in relative parallel spaced relation and preferably substantially perpendicular to the clip base 22.

An aperture provided in each of said eyelets 33 and 34 is adapted to receive one end of a coil spring 35, said end being formed into a substantial U-shaped hook, as indicated at 37, whereby the aforesaid spring is firmly anchored to the clip 21. Said coil spring 35 is provided with an elongated arm 35a, the latter being integrally formed with the coil body of said spring remote from the aforesaid hook 37, and the free end of said arm is also formed having a hook 38 which is adapted to project through an aperture 39 formed centrally in the container cover 15 to engage with the adjoining outer surface of the raised cover part 15a.

To lend support for the coil spring 35, one end 41 of an elongated rod 42, preferably formed to a configuration of a circular eyelet, is anchored to the aforesaid clip arms 23 and 24, and the shank portion of said rod is thence passed centrally through the coil body of the spring 35 and projected through the aperture 39 in the container cover 15.

With this construction, the body of the coil spring 35 is supported in its axial dimension and thereby prevented from buckling and/or becoming bent during the use of the container. It is also realized that with the coil spring attached to the clip 21 and the cover 15, the latter is anchored to the container body 10 in its closed position in the manner as is best seen in Fig. 2.

The retentive force exerted by the coil spring 35 is preferably of such magnitude as to enable an average person to readily move the cover 15 to any one of a plurality of open positions, such as is indicated by the aforementioned reference characters $P_1$ and $P_2$, whereby access to the fishing bait may hence be obtained.

The fishing bait container of the present invention is also intended to be hand portable, and for this purpose, the end of the aforesaid support rod 42, projecting through the cover aperture 39, is preferably integrally formed on its extremity with an eyelet 45, which is passed through a link 46 of a carrying handle 48, said handle having a hand gripping part as indicated at 49 in Fig. 2, by which the same may be firmly grasped by the hand to afford the manual transportation of the said container.

It oftentimes may be desirable while attempting to remove the fishing bait from the body chamber 13 to place the instant container upon a supporting surface, as indicated at S in Fig. 2. For this purpose, the exterior face of the body base wall 12 is preferably integrally formed with a plurality of raised feet 51 which are spaced circumferentially about the said base wall and project outwardly of said exterior face thereof in substantial perpendicular relation. As seen in Fig. 2, with the container supported on the aforesaid surface S by said raised feet 51, the base wall 12 is spaced slightly above said surface; the primary purpose for which will be hereinafter defined.

With the fishing bait disposed in the container chamber 13 as seen in Fig. 2, means must be provided to permit the transgression of air to and from the latter so as to sustain the useful life of said bait. To obtain this result, the container cover 15 is vented by means of a plurality of holes 53 through which air may be transmitted to afford a sufficient quantity of oxygen to said chamber and also to permit the escapement of stale air. In the embodiment herein shown said holes are arranged in concentrically disposed rings, the holes in each ring being equally spaced one from the other.

As previously mentioned, the bait container of the present invention is also intended to be inserted into a stream or the like so that fresh water may be supplied to the aforesaid chamber 13, sustaining the life of the fishing bait and also to permit said bait to be viewed through the transparent container walls and hence attract fish to the immediate vicinity.

As best seen in Fig. 3, with a predetermined quantity of water disposed in the container chamber 13 and with the container body 10 inverted and placed into the water, an air pocket 58 is formed in said chamber between the base wall 12 and the upper surface of the water in said chamber, whereby said container is made buoyant and hence floats in a partially submerged condition within said water.

The aforementioned hand gripping part 49 of the carrying handle 48, as herein shown, is substantially cylindrical and is preferably constructed of a suitable metallic material such as lead or the like, and is of such preselected weight and suspended below the container body 10 a predetermined distance so as to retain said body in said submerged position.

To assure that the container does not float away or inadvertently sink into the water out of reach of the fisherman, means are provided to secure the same to the boat, dock or other convenience used by said fisherman. For this purpose, a suitable terminal 60 is fastened to the outside face of the body base wall 12 by means of screw 61, the latter preferably being threadedly disposed in a suitably formed blind aperture 62 located centrally within said base wall and extending partially into the central part 18 of the aforementioned stepped boss. A suitable flexible cord or the like, as indicated at 63, has its one end securely fastened to said terminal by means of a lug 64 integrally formed on one end of the latter. The other end of said cord (not herein shown), is suitably secured to the aforesaid convenience used by the fisherman. In this manner, the bait container is tied to said convenience and hence prevented from floating away from the fisherman while affording the latter with means to readily remove said container from the water.

Having thus described one embodiment of my invention it is realized that additional changes, modifications and arrangements of parts may be made thereto without departing from the scope of the invention as defined in the claims.

What is claimed is:

1. In a fishing bait container, a body defining a chamber having an open end and a closed end, a cover enclosing said open end and formed with an aperture communicating with said chamber, retaining means for movably attaching said cover to said body including a coil spring extending longitudinally through said chamber and having its one end projecting through said aperture and connected to said cover inwardly of its edge, and means anchoring the opposite end of said coil spring to said closed end including clip means disposed in said chamber being secured to said closed end and operatively connected to said opposite end of said coil spring.

2. In a fishing bait container, a body defining a chamber having an open end and a closed end, a cover enclosing said open end and formed with an aperture communicating with said chamber, retaining means for movably attaching said cover to said body including a coil spring extending longitudinally through said chamber and having its one end projecting through said aperture and connected to said cover inwardly of its edge, means anchoring the opposite end of said coil spring to said body and including clip means disposed in said chamber being secured to said closed end and connected to said opposite end of said coil spring, and rod means operatively connected to said clip means and extending centrally through said coil spring to prevent the latter from buckling transversely of its axis.

3. In a fishing bait container, a body defining a chamber and having a closed end and an oppositely disposed open end, a cover enclosing said open end and formed centrally with an aperture communicating with said chamber, retaining means for movably attaching said cover to said body including a coil spring extending longitudinally through said chamber and having its one end projecting through said aperture and connected to said cover inwardly of its edge, means anchoring the opposite end of said coil spring to said body and including clip means disposed in said chamber being secured to said closed end and connected to said opposite end of said coil spring, means for carrying said container and to prevent longitudinal buckling of said coil spring including a rod disposed in said chamber being extended through said coil spring and having its one end connected to said clip means, and the opposite end of said rod projecting through said cover aperture and having a carrying handle thereon.

4. In a fishing bait container, a body defining a chamber and having an open end and an oppositely disposed closed end, a cover enclosing said open end and formed centrally with an aperture communicating with said chamber, said chamber being adapted to hold a quantity of water and said body being thereafter adapted to be placed in a body of water in an inverted position and to remain buoyant therein, said cover being formed with a plurality of apertures communicating with said chamber to permit the transgression of fluid media thereto, retaining means for movably attaching said cover to said body including a coil spring extending longitudinally through said chamber and having its one end projecting through said central aperture in said cover and connected to the latter inwardly of its edge, means anchoring the opposite end of said coil spring to said body and including clip means disposed in said chamber being secured to said closed end and connected to said opposite end of said coil spring, means for carrying said container including rod means disposed in said chamber and having one end thereof connected to said clip means, the opposite end of said rod means projecting through said central cover aperture and having a carrying handle thereon, said handle being of a predetermined weight effective to sustain the buoyancy of said body at a preselected level in said body of water.

5. In a fishing bait container, a body defining a chamber and having a closed end and an oppositely disposed open end, a cover enclosing said open end and formed centrally with an aperture communicating with said chamber, retaining means for movably attaching said cover to said body including a coil spring extending longitudinally through said chamber and having one end thereof connected to said cover adjacent the aperture therein, means anchoring the opposite end of said coil spring to said body, said anchoring means being disposed in said chamber and secured to said closed end and connected to said opposite end of said coil spring, and a rod disposed in said chamber and extending through said coil spring and having one end thereof connected to said anchoring means, the opposite end portion of said rod projecting through said cover aperture and provided with a carrying handle exteriorly of said chamber.

6. In a fishing bait container, a body defining a chamber and having an open end and an oppositely disposed closed end, a cover enclosing said open end and formed centrally with an aperture communicating with said chamber, said chamber being adapted to hold a quantity of water and said body being adapted to be placed in a body of water in an inverted position and to remain buoyant therein, said cover being formed with a plurality of apertures communicating with said chamber to permit the transgression of fluid media thereto, retaining means for movably attaching said cover to said body including a coil spring extending longitudinally in said chamber and having one end thereof connected to the cover adjacent the central aperture thereof, means anchoring the opposite end of said coil spring to said body, said anchoring means being disposed in said chamber and secured to said closed end and connected to said opposite end of said coil spring, and a rod extending through said coil spring and having one end thereof connected to said anchoring means, the opposite end portion of said rod projecting through said central cover aperture and provided with a carrying handle thereon, said handle being of a predetermined weight effective to sustain the buoyancy of the container at a preselected level in said body of water.

References Cited in the file of this patent

UNITED STATES PATENTS

| | | |
|---|---|---|
| 354,958 | Weightman | Dec. 28, 1886 |
| 1,076,542 | Balch | Oct. 21, 1913 |
| 2,265,629 | Christiansen | Dec. 9, 1941 |
| 2,518,581 | Tucker | Aug. 15, 1950 |
| 2,790,266 | Williamson | Apr. 30, 1957 |
| 2,833,080 | Hess et al. | May 6, 1958 |